(12) United States Patent
Bernstein (10) Patent No.: US 11,588,332 B2
(45) Date of Patent: Feb. 21, 2023

(54) HYBRID POWER GENERATION SYSTEM COMBINES RENEWABLE ENERGY WITH DIRECT-AIR-CAPTURE (DAC)

(71) Applicant: Glenrock Ventures II, LLC, Casper, WY (US)

(72) Inventor: Ari Mark Bernstein, New York, NY (US)

(73) Assignee: GLENROCK VENTURES II, LLC, Casper, WY (US)

( * ) Notice: Subject to any disclaimer, the term of this patent is extended or adjusted under 35 U.S.C. 154(b) by 15 days.

(21) Appl. No.: 17/393,898

(22) Filed: Aug. 4, 2021

(65) Prior Publication Data

US 2022/0045518 A1 Feb. 10, 2022

Related U.S. Application Data

(60) Provisional application No. 63/060,763, filed on Aug. 4, 2020.

(51) Int. Cl.
| | |
|---|---|
| *H02J 3/38* | (2006.01) |
| *E21B 43/00* | (2006.01) |
| *E21B 43/16* | (2006.01) |
| *E21B 47/06* | (2012.01) |
| *E21B 47/10* | (2012.01) |

(Continued)

(52) U.S. Cl.
CPC ............ *H02J 3/381* (2013.01); *E21B 43/006* (2013.01); *E21B 43/164* (2013.01); *E21B 47/06* (2013.01); *E21B 47/10* (2013.01); *F03D 9/11* (2016.05); *G05B 15/02* (2013.01);

(Continued)

(58) Field of Classification Search
CPC .. H02J 3/381; H02J 13/00002; H02J 2300/24; H02J 2300/28; H02J 3/28; H02J 15/00; E21B 43/006; E21B 43/164; E21B 47/06; E21B 47/10; E21B 43/16; F03D 9/11; G05B 15/02; Y02C 20/40;

(Continued)

(56) References Cited

U.S. PATENT DOCUMENTS

| | | | |
|---|---|---|---|
| 1,798,802 A | 3/1931 | Niles | |
| 7,143,572 B2 * | 12/2006 | Ooka | F02C 7/22 60/39.5 |

(Continued)

OTHER PUBLICATIONS

Daggash et al.; "Closing the carbon cycle to maximise climate change mitigation: power-to-methanol vs. power-to-direct air capture"; Sustainable Energy Fuels; vol. 2; 2018; p. 1153-1169.

(Continued)

*Primary Examiner* — Ramesh B Patel
(74) *Attorney, Agent, or Firm* — BakerHostetler (57) ABSTRACT

A method, system and computer-readable medium where an integrator application identifies an excess energy condition based on a supply load of electricity exceeding a consumptive load. The integrator application directs an air scrubber to utilize the excess electricity to remove carbon dioxide from the ambient air and routes the carbon dioxide to an enhanced coal bed methane well where methane is displaced by the carbon dioxide. In response to identifying an energy deficient condition based on the consumptive load exceeding the supply load, the integrator application routes the methane to a gas power plant and directs the gas power plant to convent the methane to electricity.

20 Claims, 6 Drawing Sheets

(51) Int. Cl.
*F03D 9/11* (2016.01)
*H02J 13/00* (2006.01)
*G05B 15/02* (2006.01)

(52) U.S. Cl.
CPC ..... *H02J 13/00002* (2020.01); *H02J 2300/24* (2020.01); *H02J 2300/28* (2020.01)

(58) Field of Classification Search
CPC ......... Y02E 10/56; Y02E 10/72; Y02E 10/76; Y02E 70/30
See application file for complete search history.

(56) References Cited

U.S. PATENT DOCUMENTS

| | | | | |
|---|---|---|---|---|
| 7,678,351 | B2* | 3/2010 | Iyer | B01J 20/3078 423/655 |
| 9,771,822 | B2* | 9/2017 | Knop | C25B 15/08 |
| 9,824,319 | B2* | 11/2017 | Sun | G06Q 50/06 |
| 10,110,010 | B2* | 10/2018 | Lucas | H02J 3/46 |
| 10,227,901 | B2* | 3/2019 | Bergins | C25B 15/02 |
| 10,884,039 | B2* | 1/2021 | Siebel | G06F 16/258 |
| 2008/0138265 | A1* | 6/2008 | Lackner | B01D 53/62 422/168 |
| 2015/0048703 | A1* | 2/2015 | Maldonado | G06Q 50/06 74/DIG. 9 |
| 2018/0221807 | A1* | 8/2018 | Sinatov | F02B 41/10 |
| 2020/0176997 | A1* | 6/2020 | Sachs | H02P 6/17 |

OTHER PUBLICATIONS

"Synthetic fuels: Supporting Wartsila's vision of a 100% renewable energy future"; Wartsila Technical Journal; PV Magazine; © 2020; 19 pages.

Nsikan Akpan; "The battery that captures CO2—A new device able to generate energy while reducing emissions"; https://www.eni.com/en-IT/low-carbon/battery-captures-c02.html; Accessed Dec. 8, 2020; 19 pages.

International Patent Application No. PCT/US2021/044459; Int'l Search Report and the Written Opinion; dated Nov. 9, 2021; 11 pages.

* cited by examiner

310 — Identify a deficient energy condition based on the consumptive load of electricity exceeding the supply load 320 — Direct the ECBM well or a gas storage tank to release methane that has been displaced by the removed carbon dioxide 330 — Route the produced methane to a gas power plant 340 — Direct the gas power plant to convert the produced methane to electricity

HYBRID POWER GENERATION SYSTEM COMBINES RENEWABLE ENERGY WITH DIRECT-AIR-CAPTURE (DAC)

CROSS REFERENCE TO RELATED APPLICATIONS

The current application claims priority to U.S. provisional application Ser. No. 63/060,763, filed Aug. 4, 2020, the entire disclosure of which is incorporated herein by reference.

TECHNICAL FIELD

The present disclosure relates generally to systems and methods for energy capture and storage and more particularly to systems and methods for capturing renewable energy, storing the captured energy, and utilizing the stored energy.

BACKGROUND

The modern world faces a number of dilemmas in the clean generation of electricity. For example, a pressing technological problem with major renewable sources of solar and wind power is that such renewable energy sources are intermittent nature. For example, such energy sources may only produce energy when the sun shines or the wind blows. Thus, such renewable energy sources may be incapable of meeting demand, e.g., at night or on still days.

Moreover, batteries are not capable of storing huge amounts of electricity generated while renewable energy sources are working and releasing the stored electricity when the renewable energy sources are not working. Technological requirements for batteries with required capacities to store a requisite amount of electricity are simply beyond our capabilities at the present time. For this reason, society often continues to rely on fossil-fuel power plants to take up any slack when renewable energy sources cannot keep up with demand.

Meanwhile, the most pressing ecological problem with renewable energy sources is that they do not lower the concentration of carbon-dioxide greenhouse gas in the atmosphere. Even at their respective peak efficacies, renewable energy sources simply reduce the emission of further carbon dioxide from the generation of electricity.

Accordingly, there is a need to develop a method or system that will store power from renewable energy sources when they exceed demand, release stored power when the renewable energy sources fall short of demand, and lower the levels of greenhouse gases in our environment.

SUMMARY

Embodiments of the present disclosure provide a hybrid power generation system that combines renewable energy with direct-air-capture (DAC). Whenever the renewably produced electricity is not needed, the electricity powers the DACs to vacuum $CO_2$ from the air and store it in coal seams, where the $CO_2$ would accelerate the release of methane from the coal seams.

The methane may remain underground, available to be produced on demand. The methane may act as a reservoir of fuel for a natural gas turbine or generator set that would be integrated with the renewable resource. Whenever demand for electricity exceeds that produced by the renewable source, the natural gas plant consumes the methane and produces the electricity that is needed. The emitted $CO_2$ is captured and stored underground, repeating the cycle. This closed loop system represents a rapidly scalable battery technology to complement renewable resources. In some embodiments, the system is controlled by an integrator application.

In some embodiments, an integrator application monitors a supply load of electricity (e.g., a renewable energy source such as a wind turbine or solar electric system) and a consumptive load of electricity (e.g., defined by consumer demand). The integrator application may identify an excess energy condition based on the supply load of electricity exceeding the consumptive load and route excess electricity (e.g., based on a difference between the supply load of electrify and the consumptive load of electricity) to an air scrubber (e.g., a DAC turbine). In some embodiments, the integrator application may route a portion of electricity from the supply load of electricity to a battery and route the excess electricity to the air scrubber based on identifying that the battery is fully charged.

In response to the excess energy condition, the integrator application may direct the air scrubber to utilize the routed excess electricity as a power source to remove carbon dioxide from ambient air and route the removed carbon dioxide (e.g., compressed carbon dioxide) to an enhanced coal bed methane (ECBM) well (e.g., injected into wellbores at seams of the ECBM). The integrator application may identify a deficient energy condition based on the consumptive load of electricity exceeding the supply load and, in response to the deficient energy condition, direct the ECBM well to produce methane that has been displaced by the removed carbon dioxide. The integrator application may route the produced methane to a gas power plant and, based on the deficient energy condition, direct the gas power plant to convert the produced methane to electricity. In some embodiments, the integrator application may monitor a pressure and a flow of the ECBM well and, based on the pressure and the flow of the ECBM well, maintain a balanced condition of the ECBM well. For example, the integrator application may maintain safe coal bed pressure by only routing carbon dioxide to wells that are not pressurized to capacity, or by extracting methane from fully-pressurized wells to make room for additional carbon dioxide storage.

Accordingly, in some examples, the disclosure addresses technological and ecological problems by removing carbon dioxide from the ambient air and remedying a deficit of renewably generated electricity at least in part by stored energy resulting from a prior excess energy condition.

In accordance with some examples, a computer readable storage medium has stored therein instructions that are computer executable to perform or cause performance of any of the methods described herein. In accordance with some examples, an integrator device includes one or more processors, a memory, and one or more programs; the one or more programs are stored in the memory and configured to be executed by the one or more processors and the one or more programs include instructions for performing or causing performance of any of the methods described herein.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, it is not necessary that the claimed subject matter address any or all of the stated objects or advantages provided herein as there may exist additional advantages of the disclosed technology that are inherent and not expressly disclosed.

BRIEF DESCRIPTION OF THE DRAWINGS

Reference will now be made to the accompanying drawings, which are not necessarily drawn to scale.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The disclosed subject matter may capture renewable energy, store the captured energy, and utilize the stored energy.

Figure 1:
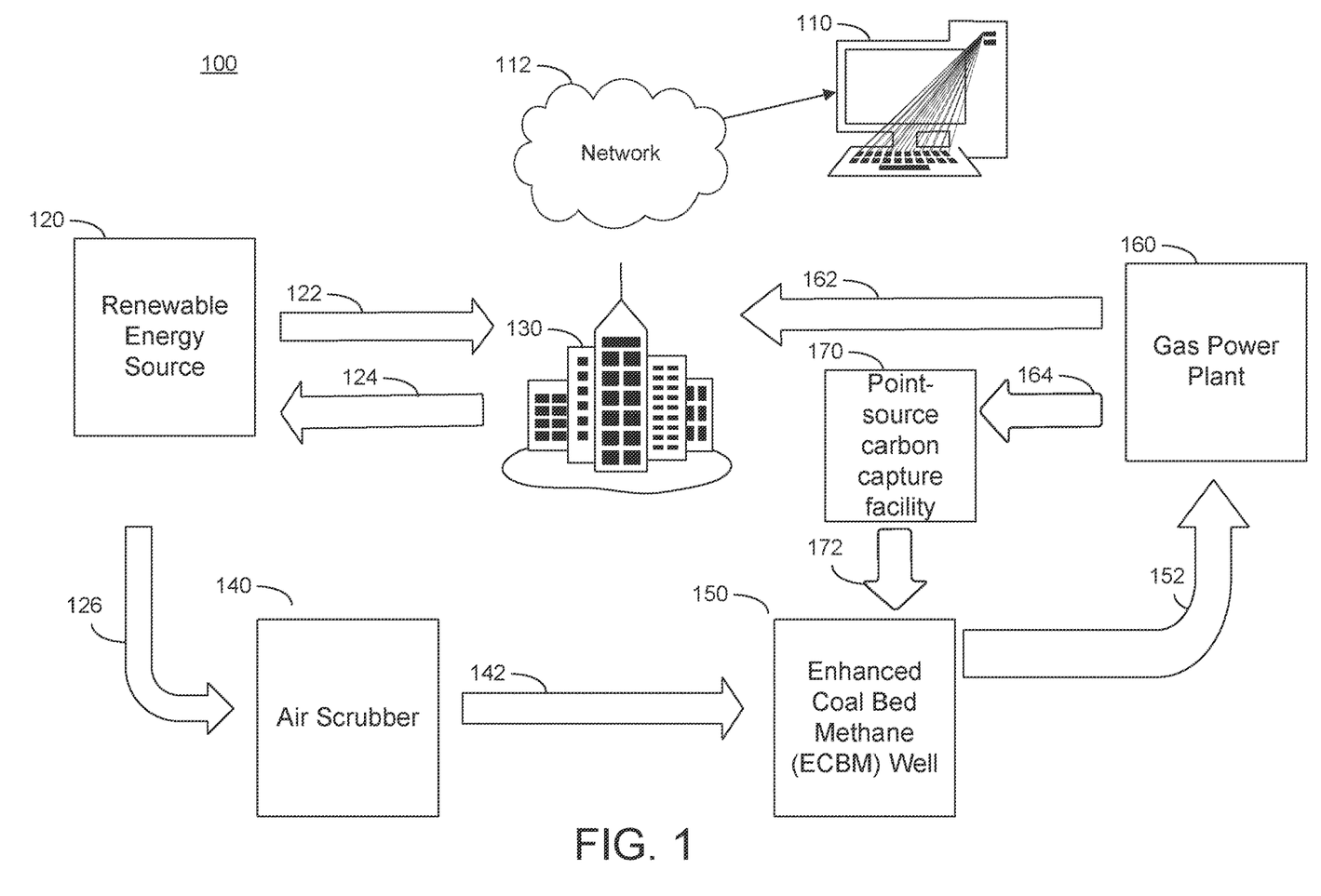
FIG. 1 illustrates an exemplary system architecture for capturing renewable energy, storing the captured energy, and utilizing the stored energy, among other things.

FIG. 1 illustrates an exemplary system architecture 100 for capturing renewable energy, storing the captured energy, and utilizing the stored energy, among other things. System architecture 100 may include a computerized integrator 110, a network 112, a renewable energy source 120, an energy consumer 130, an air scrubber 140, an enhanced coal bed methane (ECBM) well 150, and a gas power plant 160.

In an embodiment, one or more renewable energy sources such as (but not limited to) wind turbines or solar electric systems my provide a supply load of electricity 122 to one or more energy consumers (e.g., energy consumer 130). Moreover, energy consumer may demand a consumptive load of electricity 124. The supply load of electricity 122 and the demand load of electricity 124 may be monitored (e.g., by an integrator application) by the computerized integrator 110 via the network 112.

In some embodiments, if the supply load of electricity 122 exceeds the consumptive load of electricity 124, the computerized integrator 110 may identify an excess energy condition and route (e.g., by the integrator application via electric transmission lines) excess electricity 126 to an air scrubber 140, e.g., a direct air capture (DAC) turbine. For example, the excess electricity 126 may include part or all of the difference between the supply load of electricity 122 and the consumptive load of electricity 124.

In some embodiments, the computerized integrator 110 may, prior to routing the excess electricity 126 to the air scrubber 140, ensure electric load stability by routing (e.g., by the integrator application via electric transmission lines) a portion or all of the excess electricity 128 to a battery. Moreover, the computerized integrator 110 may then, upon identifying that the battery is fully charged, route (e.g., by the integrator application via electric transmission lines) the excess electricity 128 to the air scrubber 140.

In some embodiments, the computerized integrator 110 may direct (e.g., by the integrator application), the air scrubber 140 to utilize the excess electricity 128 as a power source to remove carbon dioxide from the ambient air. The computerized integrator 110 may then route (e.g., by the integrator application via pipelines) the removed carbon dioxide 142 to an ECBM well 150. For example, the removed carbon dioxide 142 may be compressed carbon dioxide and may be injected into one or more wellbores at one or more seams of the ECBM well 150.

In some embodiments, the computerized integrator 110 may identify (e.g., by the integrator application) a deficient energy condition based on the consumptive load of electricity 124 exceeding the supply load of electricity 122 and direct (e.g., by the integrator application) the ECBM well 150 to produce methane 152 that has been displaced by the removed carbon dioxide 142. The produced methane 152 may then be directed by the computerized integrator (e.g., by the integrator application) to a gas power plant 160.

In some embodiments, the computerized integrator may direct (e.g., by the integrator application) the gas power plant 160 to convert the produced methane to electricity 162. For example, the produced electricity 162 may be routed to the energy consumer 130 to compensate for the deficit of renewably generated electricity. Accordingly, the deficient energy condition may be fully or partially addressed by the produced electricity 162.

In some embodiments, the computerized integrator may direct the ECBM wells 150 to produce methane 152 and pipe it to a gas power plant 160 if overpressure conditions occur. The objective of the integrator is to maintain balance of methane.

In some embodiments, the exhaust stream 164 from a natural gas plant 160 may be directed to a carbon capture facility 170, from where the carbon dioxide 172 may be routed to an ECBM well 150, thus eliminating emissions from the natural gas plant and increasing the net supply of methane for future combustion.

Figure 2:
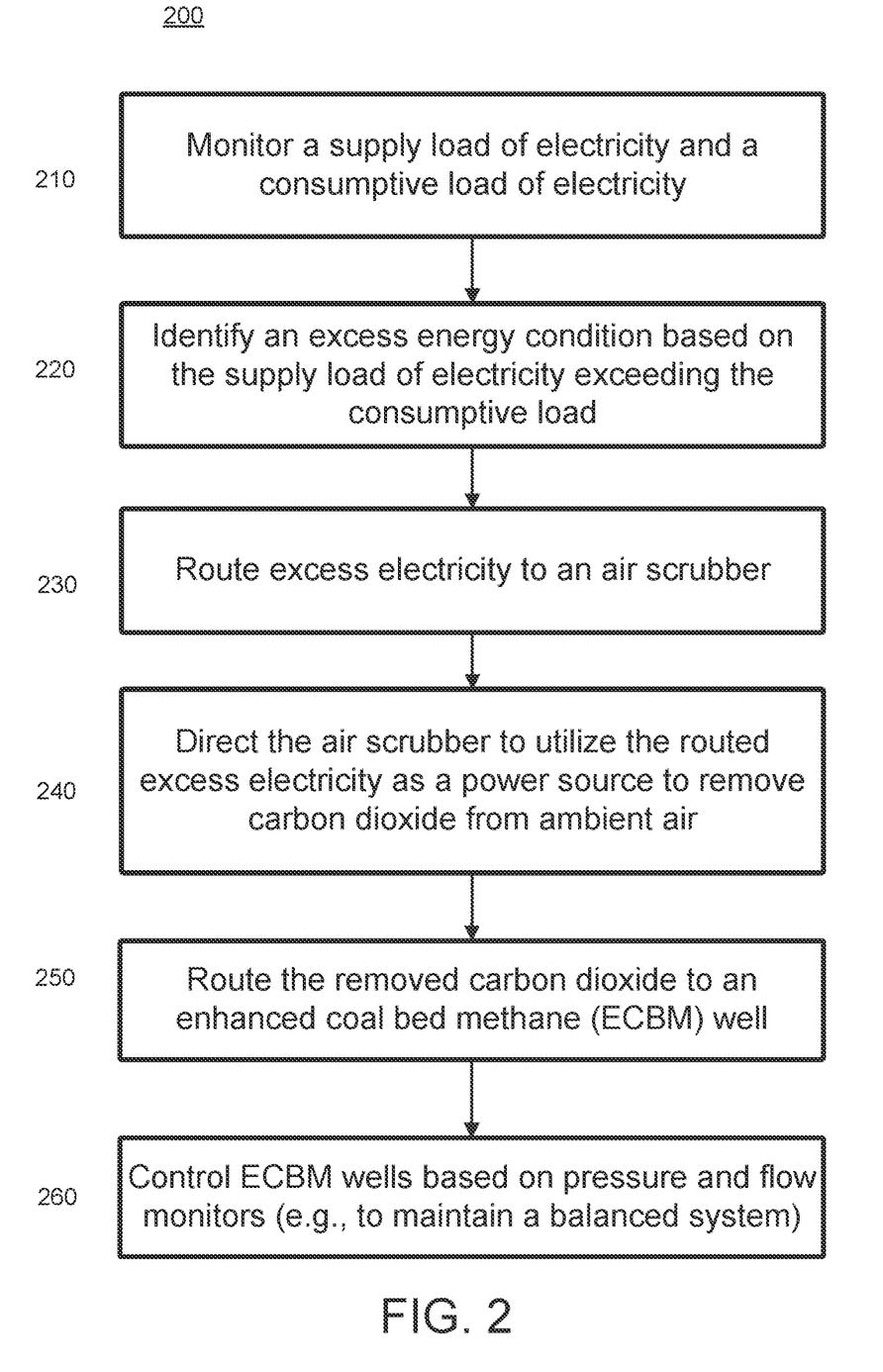
FIG. 2 illustrates an exemplary method for capturing renewable energy and storing the captured energy, among other things.

FIG. 2 illustrates an exemplary method 200 for capturing renewable energy (e.g., excess electricity 126) and storing the captured renewable energy (e.g., methane 152). In some examples, the method 200 is performed by a device or machine (e.g., computerized integrator 110). Moreover, the method 200 may be performed at a network device, desktop, laptop, mobile device, server device, or by multiple devices in communication with one another. In some examples, the method 200 is performed by processing logic, including hardware, firmware, software, or a combination thereof. In some examples, the method 200 is performed by a processor executing code stored in a computer-readable medium (e.g., a memory).

At block 210, the method 200 monitors a supply load of electricity and a consumptive load of electricity. At block 220, the method 200 identifies an excess energy condition based on the supply load of electricity exceeding the consumptive load. At block 230, the method 200 routes excess electricity to an air scrubber.

For example, whenever the supply load of electricity exceeds the consumptive load of electricity, the method 200 may dispatch the excess electricity to a DAC, which may be integrated with a battery to ensure stable electric supply load to the DAC. Moreover, electricity arriving at the DAC may first be utilized by method 200 to charge the battery and, until the battery is fully charged, the method 200 may continue to channel electricity at a DAC site to charge the battery.

At block 240, the method 200 directs the air scrubber to utilize the routed excess electricity as a power source to remove carbon dioxide from ambient air. Therefore, the concentration of carbon dioxide greenhouse gas is reduced in the ambient air. In some examples, DAC scrubbers (sometimes called "artificial trees," for their effect in pulling carbon dioxide from the air) may be associated with commercial use in food and beverages, the production of chemicals and building materials, enhanced oil recovery, the making of carbon fiber, etc.

As a further example, once the battery is fully charged, the next dispatches of electricity from the renewable sources may be used by method 300 to power the DAC's turbines to suck in air, capture CO2, and compress it for transportation (e.g., a capture and compression cycle). Accordingly, the method 200 may monitor the supply and demand of electricity and activates and deactivates components as appropriate. If the capture and compression cycle is initiated due to a brief surge in electricity supply and supply is insufficient to complete the entire capture and compression cycle, the method 200 may activate the battery and uses its electricity to complete the capture and compression cycle.

At block 250, the method 200 routes the removed carbon dioxide to an ECBM well. For example, compressed carbon dioxide may be transported by method 200 via pipeline to the ECBM well and injected into the coalbed, where it displaces methane in the coal, releasing the methane as a gas. In some examples, the pressure of the carbon dioxide displaces the methane absorbed in the coal matrix, releasing the methane to rise to the wellhead much faster and much more cleanly than traditional methods of natural release or the injection of water. The resulting stored energy in the form of the methane may remain in situ.

At block 260, the method 200 controls ECBM wells based on pressure and flow monitors, e.g., to maintain a balanced condition of the ECBM wells. For example, the method 200 may monitor the pressure and quantity of methane in the coal seam. In order to maintain a safe and reliable balance of gases in the coal seam, the method 200 may direct one or more ECBM wells to produce methane and pipe it to a storage tank or natural gas pipeline.

Examples of the methods disclosed herein may be performed in the operation of such computing devices. The order of the blocks presented in the examples herein can be varied. For example, blocks can be re-ordered, combined, or broken into sub-blocks. Certain blocks or processes can be performed in parallel.

Figure 3:
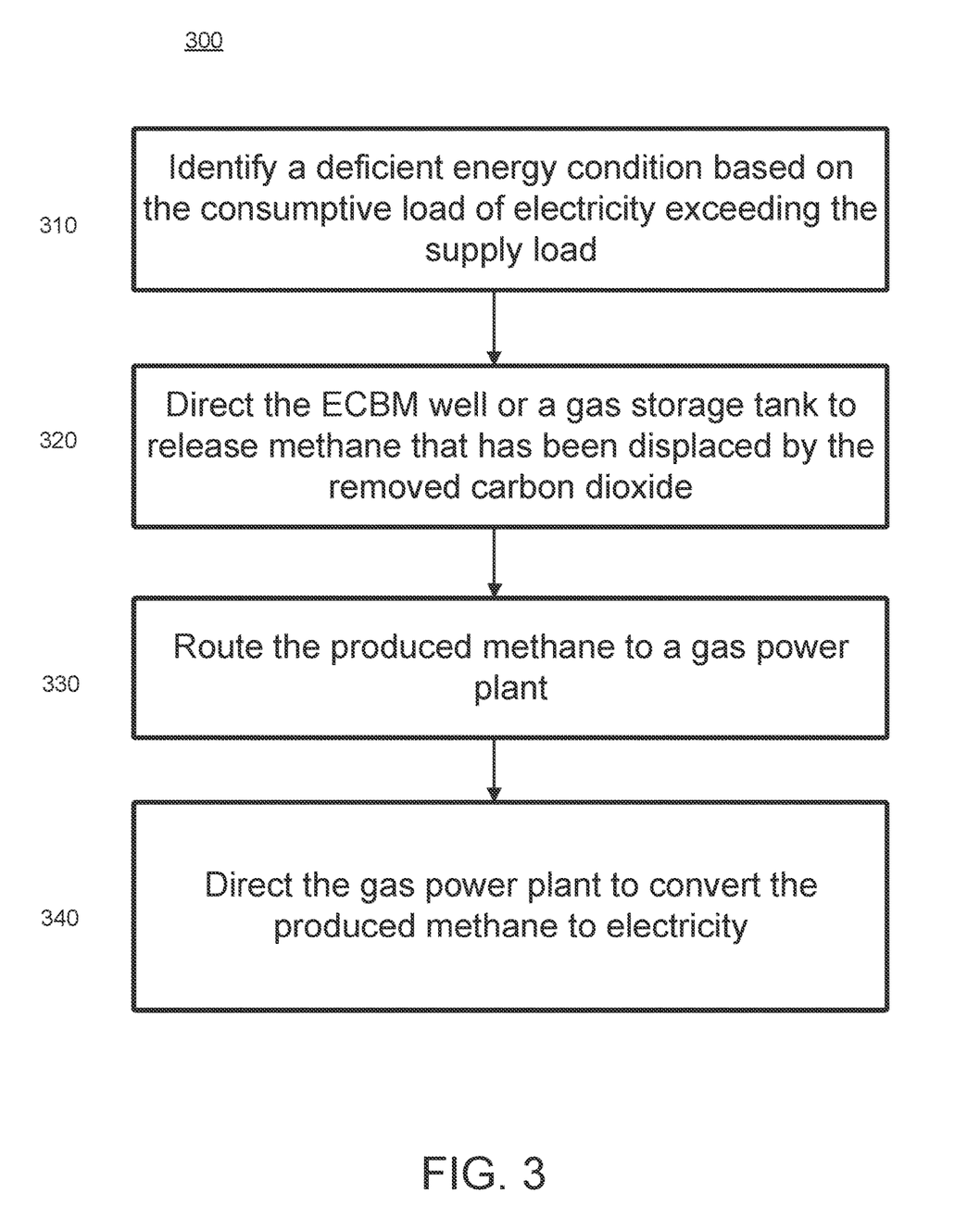
FIG. 3 illustrates an exemplary method for utilizing stored energy to address an energy deficiency, among other things.

FIG. 3 illustrates an exemplary method 300 for utilizing stored energy (e.g., methane 152) to address an energy deficiency. In some examples, the method 300 is performed by a device or machine (e.g., computerized integrator 110). Moreover, the method 300 may be performed at a network device, desktop, laptop, mobile device, server device, or by multiple devices in communication with one another. In some examples, the method 300 is performed by processing logic, including hardware, firmware, software, or a combination thereof. In some examples, the method 300 is performed by a processor executing code stored in a computer-readable medium (e.g., a memory).

At block 310, the method 300 identifies a deficient energy condition based on the consumptive load of electricity exceeding the supply load. At block 320, the method 300 directs the ECBM well to produce methane that has been displaced by the removed carbon dioxide. For example, whenever the demand of consumptive load exceeds the supply load from the renewable sources, the method 200 may signal the ECBM well to produce the methane that has been displaced by the carbon dioxide.

At block 330, the method 300 routes the produced methane to a gas power plant. At block 340, the method 300 directs the gas power plant to convert the produced methane to electricity. For example, the methane may be sent by method 300 via pipeline to a gas power plant, where the methane is burned to supply electricity to compensate for the deficit of renewably generated electricity.

Examples of the methods disclosed herein may be performed in the operation of such computing devices. The order of the blocks presented in the examples herein can be varied. For example, blocks can be re-ordered, combined, or broken into sub-blocks. Certain blocks or processes can be performed in parallel.

Figure 4:
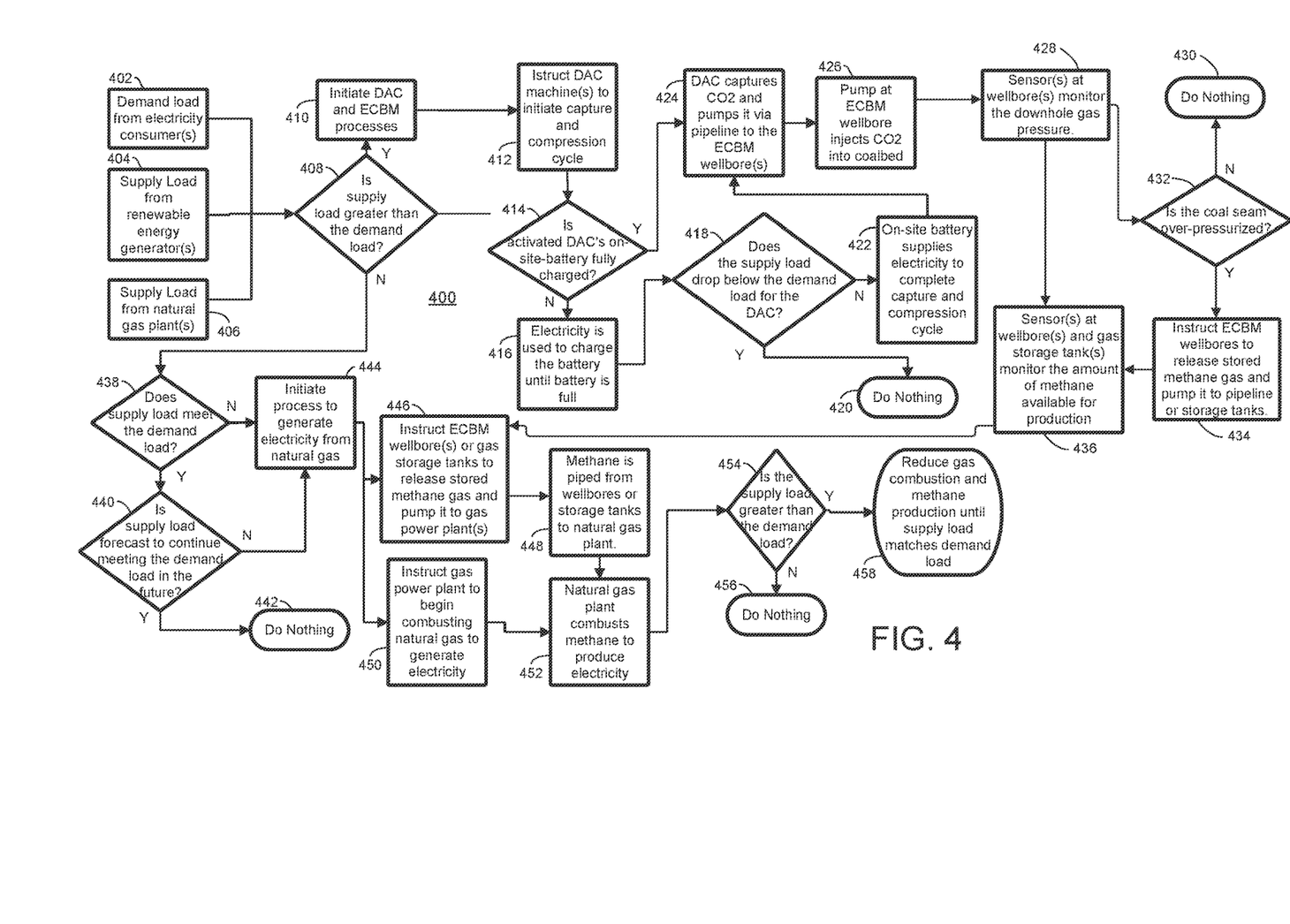
FIG. 4 illustrates an exemplary method for capturing renewable energy, storing the captured energy, and utilizing the stored energy to address an energy deficiency, among other things.

FIG. 4 illustrates an exemplary method 400 for capturing renewable energy, storing the captured energy, and utilizing the stored energy to address an energy deficiency. In some examples, the method 400 is performed by a device or machine (e.g., computerized integrator 110). Moreover, the method 400 may be performed at a network device, desktop, laptop, mobile device, server device, or by multiple devices in communication with one another. In some examples, the method 400 is performed by processing logic, including hardware, firmware, software, or a combination thereof. In some examples, the method 400 is performed by a processor executing code stored in a computer-readable medium (e.g., a memory).

In some embodiments, an integrator (e.g., computerized integrator 100) may interact with one or more intermittent renewable energy generators (e.g., wind and solar), one or more DAC machines (e.g., each DAC machine including an on-site-battery to ensure load stability), one or more pumps at one or more ECBM wellbores, one or more natural gas plants (e.g., each ECBM wellbore fed methane via pipelines from one or more ECBM wells), one or more sensors that monitor electricity supply and demand loads, one or more computer programs that model future supply and demand loads, and one or more transmission lines to transport electricity.

According to the illustrated embodiment, the method 400 may monitor demand load electricity from one or more energy consumers (e.g., block 402), supply load from one or more renewable energy generators (e.g., block 404), and supply load from one or more natural gas plants (e.g., block 406).

The method 400 may determine whether the supply load is greater than the demand load (e.g., decision block 408). If supply load is greater than the demand load (e.g., decision block 408), the method 400 may initiate DAC and ECBM processes (e.g., block 410) and instruct one or more DAC machines to initiate a capture and compression cycle (e.g., block 412). For example, the number of DAC machines activated is a function of generating demand load to match the supply load of electricity.

The method 400 may send instructions to one or more DACs to activate a number of the DACs and determines whether one or more on-site batteries associated with each activated DAC are fully charged (e.g., decision block 414). If one or more of the batteries are not fully charged (e.g., decision block 414), the method 400 may use excess electricity (e.g., resulting from the difference between the supply load and the demand load) to charge the one or more batteries until the batteries are fully charged (e.g., block 416). Once the batteries are fully charged, the method 400 may determine whether the supply load of electricity from the renewable energy sources drops below the demand load for the DAC (e.g., decision block 418). If the supply load of electricity does drop below the demand load (e.g., decision block 418), the method 400 may do nothing (e.g., block 420).

If the supply load does not drop below the demand load for the DAC (e.g., decision block 418) or the activated DAC's on-site battery is fully charged (e.g., decision block 414), the method 400 may instruct the DAC to capture CO2 and pump it via pipeline to one or more ECBM wellbores (e.g., block 424). Moreover, the method 400 may instruct one or more pumps at each ECBM wellbore to inject CO2 into the coalbed and displace methane from the coal (e.g., block 426). The method 400 may utilize sensors at the wellbores to monitor the pressure in the coal seam (e.g., block 428). If the coal seam becomes over-pressurized (e.g., decision block 432), the method 400 may instruct one or more ECBM wellbores to produce methane (e.g., block 434). The method 400 may also utilize one or more sensors at the wellbores to monitor the amount of methane available for production (e.g., block 436).

If the supply load is not greater than the demand load (e.g., decision block 408), the method 400 may determine whether the supply load meets the demand load (e.g., decision block 438). If the supply load does meet the demand load (e.g., decision block 408), the method 400 may forecast the supply load and determine whether the forecasted supply load will meet the demand load in the future (e.g., decision block 440). If the forecasted supply load will meet the demand load in the future (e.g., decision block 440), the method 400 may do nothing (e.g., block 442).

If the supply load does not meet the demand load (e.g., decision block 438) or the forecasted supply load does not meet the demand load in the future (e.g., decision block 440), the method 400 may initiate processes to generate electricity from natural gas (e.g., block 444). For example, the natural gas may include stored methane (e.g., the methane in situ from block 426 or in storage tanks from block 434). Moreover, the method 400 may instruct one or more ECBM wellbores or natural gas storage tanks to release stored methane gas and pump the released methane gas to one or more power plants (e.g., block 446). The method 400 may instruct one or more ECBM wells to pipe methane from the wellbore or storage tanks to one or more natural gas plants (e.g., block 448). The natural gas plant may then combust methane (e.g., from block 446 or block 448) to combust methane to produce electricity (e.g. block 450 or block 452).

If the supply load is greater than the demand load (e.g., decision block 454), the method 400 may reduce gas combustion and methane production until the supply load matches the demand load (e.g., block 456). If the supply load is not greater than the demand load (e.g., decision block 454) the method 400 may do nothing (e.g., block 458).

Examples of the methods disclosed herein may be performed in the operation of such computing devices. The order of the blocks presented in the examples herein can be varied. For example, blocks can be re-ordered, combined, or broken into sub-blocks. Certain blocks or processes can be performed in parallel.

Figure 5:
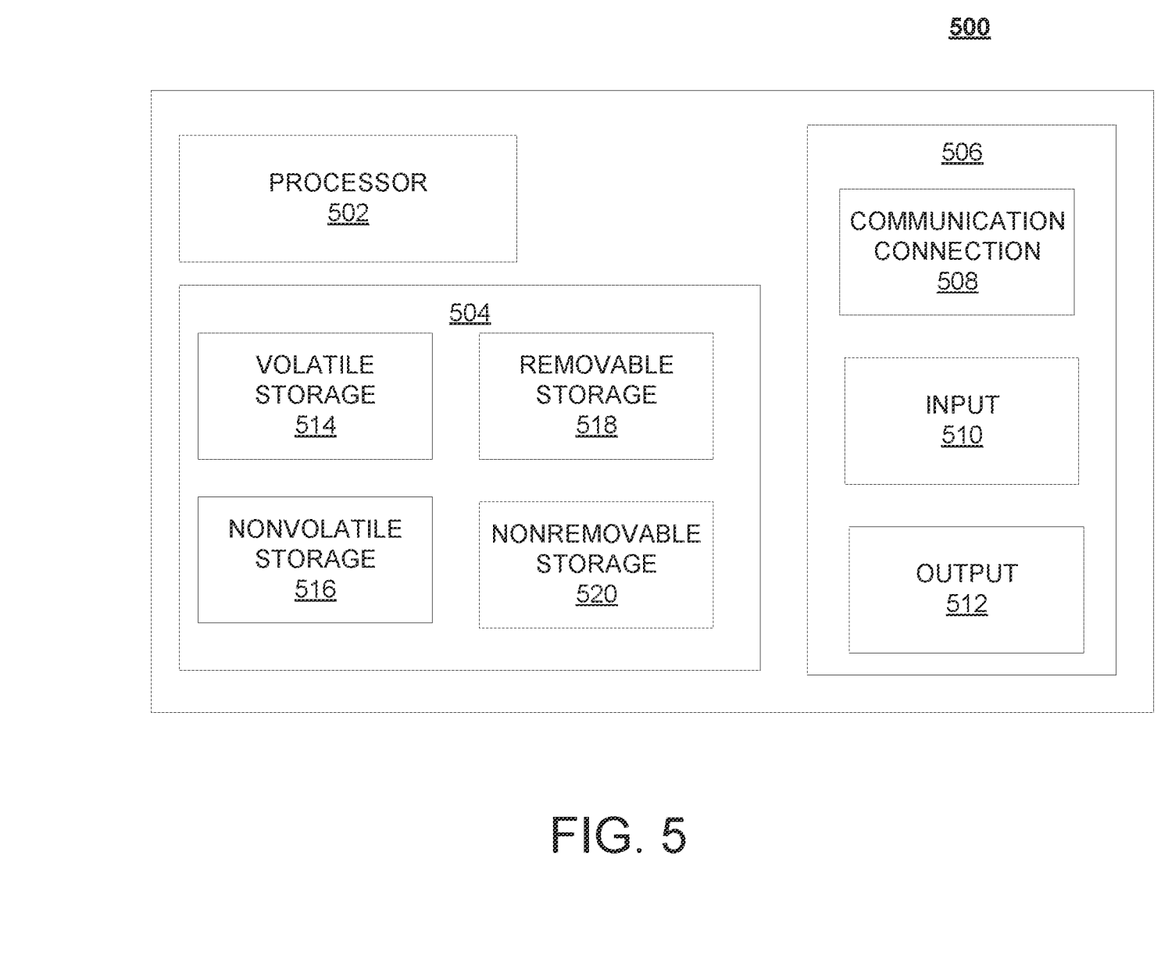
FIG. 5 illustrates a schematic of an exemplary network device.

FIG. 5 is a block diagram of a network device 500, such as an example computerized integrator 100, that may be connected to or comprise a component of network 112. Network device 500 may comprise hardware or a combination of hardware and software. The functionality to facilitate communications via a communications network may reside in one or a combination of network devices 500. Network device 500 depicted in FIG. 4 may represent or perform functionality of an appropriate network device 500, or a combination of network devices 500, such as, for example, a component or various components of a cellular broadcast system wireless network, a processor, a server, a gateway, an LTE or 5G anchor node or eNB, a mobile switching center (MSC), a short message service center (SMSC), an automatic location function server (ALFS), a gateway mobile location center (GMLC), a serving gateway (S-GW), a packet data network (PDN) gateway, an RAN, a serving mobile location center (SMLC), or the like, or any appropriate combination thereof. It is emphasized that the block diagram depicted in FIG. 5 is exemplary and not intended to imply a limitation to a specific example or configuration. Thus, network device 500 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 500 may comprise a processor 502 and a memory 504 coupled to processor 502. Memory 504 may contain executable instructions that, when executed by processor 502, cause processor 502 to effectuate operations associated with capturing energy, storing the captured energy, and utilizing the stored energy. As evident from the description herein, network device 500 is not to be construed as software per se.

In addition to processor 502 and memory 504, network device 500 may include an input/output system 506. Processor 502, memory 504, and input/output system 506 may be coupled together (coupling not shown in FIG. 5) to allow communications between them. Each portion of network device 500 may comprise circuitry for performing functions associated with each respective portion. Thus, each portion may comprise hardware, or a combination of hardware and software. Accordingly, each portion of network device 500 is not to be construed as software per se. Input/output system 506 may be capable of receiving or providing information from or to a communications device or other network entities configured for telecommunications. For example, input/output system 506 may include a wireless communications (e.g., 3G/4G/5G/GPS) card. Input/output system 506 may be capable of receiving or sending video information, audio information, control information, image information, data, or any combination thereof. Input/output system 506 may be capable of transferring information with network device 500. In various configurations, input/output system 506 may receive or provide information via any appropriate means, such as, for example, optical means (e.g., infrared), electromagnetic means (e.g., RF, Wi-Fi, Bluetooth®, Zig-Bee®), acoustic means (e.g., speaker, microphone, ultrasonic receiver, ultrasonic transmitter), or a combination thereof. In an example configuration, input/output system 506 may comprise a Wi-Fi finder, a two-way GPS chipset or equivalent, or the like, or a combination thereof.

Input/output system 506 of network device 500 also may contain a communication connection 508 that allows network device 500 to communicate with other devices, network entities, or the like. Communication connection 508 may comprise communication media. Communication media typically embody computer-readable instructions, data structures, program modules or other data in a modulated data signal such as a carrier wave or other transport mechanism and includes any information delivery media.

By way of example, and not limitation, communication media may include wired media such as a wired network or direct-wired connection, or wireless media such as acoustic, RF, infrared, or other wireless media. The term computer-readable media as used herein includes both storage media and communication media. Input/output system 506 also may include an input device 510 such as keyboard, mouse, pen, voice input device, or touch input device. Input/output system 506 may also include an output device 512, such as a display, speakers, or a printer.

Processor 502 may be capable of performing functions associated with telecommunications, such as functions for processing broadcast messages, as described herein. For example, processor 502 may be capable of, in conjunction with any other portion of network device 500, determining a type of broadcast message and acting according to the broadcast message type or content, as described herein.

Memory 504 of network device 500 may comprise a storage medium having a concrete, tangible, physical structure. As is known, a signal does not have a concrete, tangible, physical structure. Memory 504, as well as any computer-readable storage medium described herein, is not to be construed as a signal. Memory 504, as well as any computer-readable storage medium described herein, is not to be construed as a transient signal. Memory 504, as well as any computer-readable storage medium described herein, is not to be construed as a propagating signal. Memory 504, as well as any computer-readable storage medium described herein, is to be construed as an article of manufacture.

Memory 504 may store any information utilized in conjunction with communications. Depending upon the exact configuration or type of processor, memory 504 may include a volatile storage 514 (such as some types of RAM), a nonvolatile storage 516 (such as ROM, flash memory), or a combination thereof. Memory 504 may include additional storage (e.g., a removable storage 518 or a non-removable storage 520) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 500. Memory 504 may comprise executable instructions that, when executed by processor 502, cause processor 502 to effectuate operations to capture energy, store the captured energy, or utilize the stored energy.

Figure 6:
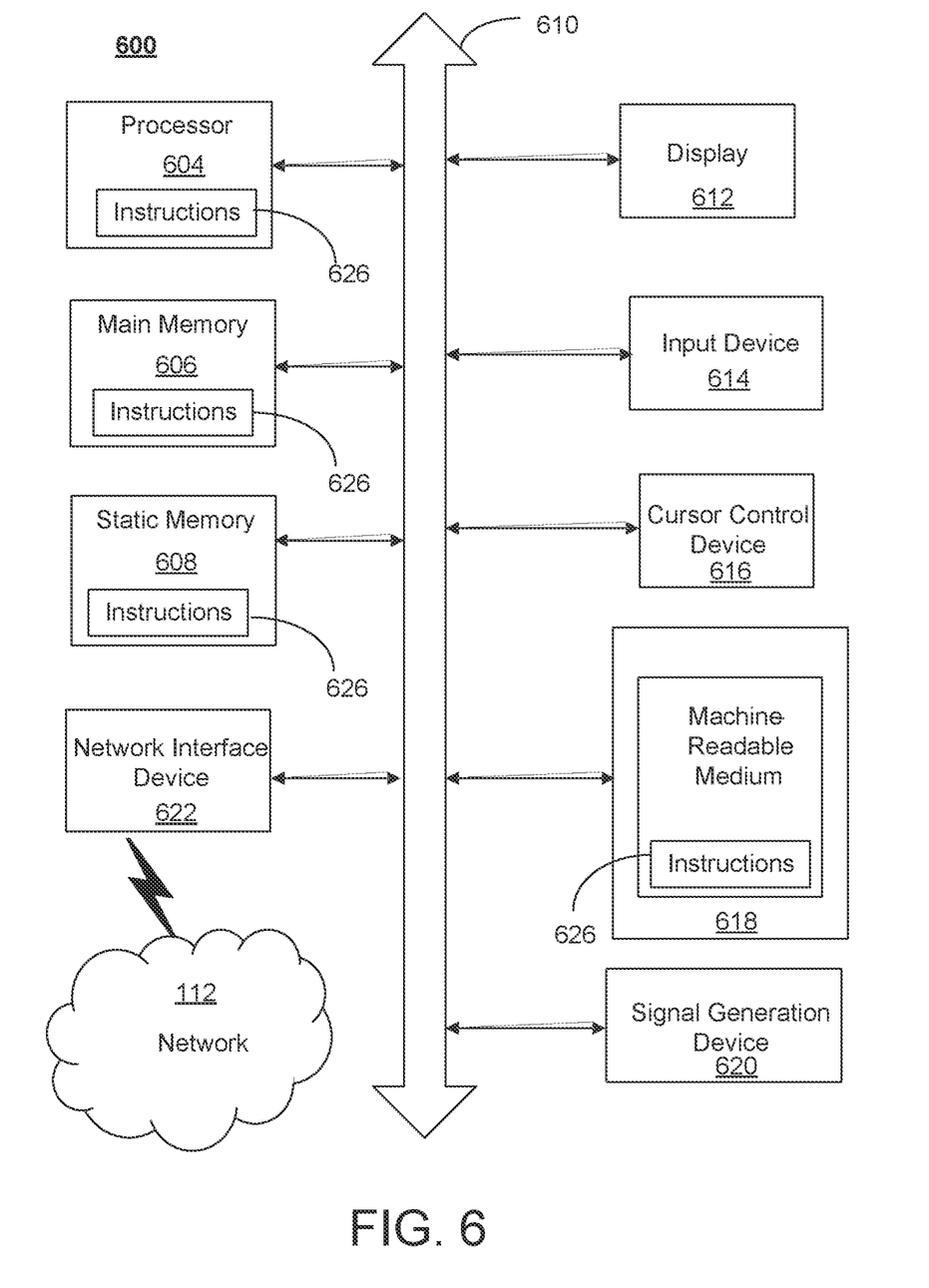
FIG. 6 illustrates an exemplary diagrammatic representation of a machine in the form of a computer system.

FIG. 6 depicts an exemplary diagrammatic representation of a machine in the form of a computer system 600 within which a set of instructions, when executed, may cause the machine to perform any one or more of the methods described above. One or more instances of the machine can operate, for example, as processor 402, computer 110, and other devices of FIG. 1, FIG. 2, FIG. 3, FIG. 4, and FIG. 5. In some examples, the machine may be connected (e.g., using a network 112) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 600 may include a processor (or controller) 604 (e.g., a central processing unit (CPU)), a graphics processing unit (GPU, or both), a main memory 606 and a static memory 608, which communicate with each other via a bus 610. The computer system 600 may further include a display unit 612 (e.g., a liquid crystal display (LCD), a flat panel, or a solid-state display). Computer system 600 may include an input device 614 (e.g., a keyboard), a cursor control device 616 (e.g., a mouse), a disk drive unit 618, a signal generation device 620 (e.g., a speaker or remote control) and a network interface device 622. In distributed environments, the examples described in the subject disclosure can be adapted to utilize multiple display units 612 controlled by two or more computer systems 600. In this configuration, presentations described by the subject disclosure may in part be shown in a first of display units 612, while the remaining portion is presented in a second of display units 612.

The disk drive unit 618 may include a tangible computer-readable storage medium on which is stored one or more sets of instructions (e.g., instructions 626) embodying any one or more of the methods or functions described herein, including those methods illustrated above. Instructions 626 may also reside, completely or at least partially, within main memory 606, static memory 608, or within processor 604 during execution thereof by the computer system 600. Main memory 606 and processor 604 also may constitute tangible computer-readable storage media.

While examples of a system for capturing energy, storing the captured energy, and utilizing the stored energy have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer readable storage medium is not a propagating signal. A computer-readable storage medium as described herein is an article of manufacture. When the program code is loaded into and executed by a machine, such as a computer, the machine becomes a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language and may be combined with hardware implementations.

The methods and devices associated with a system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an erasable programmable read-only memory (EPROM), a gate array, a programmable logic device (PLD), a client computer, or the like, the machine becomes a device for implementing telecommunications as described herein. When implemented on a general purpose processor, the program code combines with the processor to provide a unique device that operates to invoke the functionality of a telecommunications system.

While the disclosed systems have been described in connection with the various examples of the various figures, it is to be understood that other similar implementations may be used, or modifications and additions may be made to the described examples without deviating therefrom. Therefore, the disclosed systems as described herein should not be limited to any single example, but rather should be construed in breadth and scope in accordance with the appended claims.

In describing preferred methods, systems, or apparatuses of the subject matter of the present disclosure—capturing energy, storing the captured energy, and utilizing the stored energy—as illustrated in the Figures, specific terminology is employed for the sake of clarity. The claimed subject matter, however, is not intended to be limited to the specific terminology so selected. In addition, the use of the word "or" is generally used inclusively unless otherwise provided herein.

This written description uses examples to enable any person skilled in the art to practice the claimed subject matter, including making and using any devices or systems and performing any incorporated methods. Other variations of the examples are contemplated herein.

What is claimed:

1. A system comprising:
memory for storing computer instructions; and
one or more processors coupled with the memory, wherein the one or more processors, responsive to executing the computer instructions, performs operations comprising:
monitoring, by an integrator application, a supply load of electricity and a consumptive load of electricity;
identifying, by the integrator application, an excess energy condition based on the supply load of electricity exceeding the consumptive load;
routing, by the integrator application, excess electricity to an air scrubber;
directing, by the integrator application in response to the excess energy condition, the air scrubber to utilize the routed excess electricity as a power source to remove carbon dioxide from ambient air;
routing, by the integrator application, the removed carbon dioxide to an enhanced coal bed methane (ECBM) well;
identifying, by the integrator application, a deficient energy condition based on the consumptive load of electricity exceeding the supply load;
directing, by the integrator application in response to the deficient energy condition, the ECBM well to produce methane that has been displaced by the removed carbon dioxide;
routing, by the integrator application, the produced methane to a gas power plant; and
directing, by the integrator application based on the deficient energy condition, the gas power plant to convert the produced methane to electricity.

2. The system of claim 1, wherein the processor, responsive to executing the computer instructions, performs operations comprising:
routing, by the integrator application in response to the excess energy condition, a portion of electricity from the supply load of electricity to a battery; and
identifying, by the integrator application, that the battery is fully charged, wherein routing the excess electricity to the air scrubber is based on the identification that the battery is fully charged.

3. The system of claim 1, wherein the processor, responsive to executing the computer instructions, performs operations comprising:
monitoring, by the integrator application, a pressure and a flow of the ECBM well; and
maintaining, by the integrator application based on the pressure and the flow of the ECBM well, a balanced condition of the ECBM well.

4. The system of claim 1, wherein the excess electricity is based on a difference between the supply load of electricity and the consumptive load of electricity.

5. The system of claim 1, wherein conversion of the produced methane to electricity compensates for the deficient energy condition.

6. The system of claim 1, wherein the consumptive load of electricity is based on a consumer demand.

7. The system of claim 1, wherein the removed carbon dioxide is compressed and injected into wellbores at one or more seams of the ECBM well.

8. The system of claim 1, wherein the renewable energy source is a wind turbine.

9. The system of claim 1, wherein the renewable energy source is a solar electric system.

10. The system of claim 1, wherein the air scrubber is a direct air capture (DAC) turbine.

11. A method comprising:
monitoring, by a computer in an integrator application, a supply load of electricity and a consumptive load of electricity;
identifying, by the computer in the integrator application, an excess energy condition based on the supply load of electricity exceeding the consumptive load;
routing, by the computer in the integrator application, excess electricity to an air scrubber;
directing, by the computer in the integrator application in response to the excess energy condition, the air scrubber to utilize the routed excess electricity as a power source to remove carbon dioxide from ambient air;
routing, by the computer in the integrator application, the removed carbon dioxide to an enhanced coal bed methane (ECBM) well;
identifying, by the computer in the integrator application, a deficient energy condition based on the consumptive load of electricity exceeding the supply load;
directing, by the computer in the integrator application in response to the deficient energy condition, the ECBM well to produce methane that has been displaced by the removed carbon dioxide;
routing, by the computer in the integrator application, the produced methane to a gas power plant; and
directing, by the computer in the integrator application based on the deficient energy condition, the gas power plant to convert the produced methane to electricity.

12. The method of claim 11, further comprising:
routing, by the computer in the integrator application in response to the excess energy condition, a portion of electricity from the supply load of electricity to a battery; and
identifying, by the computer in the integrator application, that the battery is fully charged, wherein routing the excess electricity to the air scrubber is based on the identification that the battery is fully charged.

13. The method of claim 11, further comprising:
monitoring, by the computer in the integrator application, a pressure and a flow of the ECBM well; and
maintaining, by the computer in the integrator application based on the pressure and the flow of the ECBM well, a balanced condition of the ECBM well.

14. The method of claim 11, wherein the excess electricity is based on a difference between the supply load of electricity and the consumptive load of electricity.

15. The method of claim 11, wherein conversion of the produced methane to electricity compensates for the deficient energy condition.

16. The method of claim 11, wherein the consumptive load of electricity is based on a consumer demand.

17. The method of claim 11, wherein the removed carbon dioxide is compressed and injected into wellbores at one or more seams of the ECBM well.

18. The method of claim 11, wherein the renewable energy source is a wind turbine.

19. The method of claim 11, wherein the renewable energy source is a solar electric system.

20. A computer program product comprising:
a computer-readable storage medium; and
instructions stored on the computer-readable storage medium that, when executed by a processor, causes the processor to:
monitor, by an integrator application, a supply load of electricity and a consumptive load of electricity;
identify, by the integrator application, an excess energy condition based on the supply load of electricity exceeding the consumptive load;
route, by the integrator application, excess electricity to an air scrubber;
direct, by the integrator application in response to the excess energy condition, the air scrubber to utilize the routed excess electricity as a power source to remove carbon dioxide from ambient air;
route, by the integrator application, the removed carbon dioxide to an enhanced coal bed methane (ECBM) well;
identify, by the integrator application, a deficient energy condition based on the consumptive load of electricity exceeding the supply load;
direct, by the integrator application in response to the deficient energy condition, the ECBM well to produce methane that has been displaced by the removed carbon dioxide;
route, by the integrator application, the produced methane to a gas power plant; and
direct, by the integrator application based on the deficient energy condition, the gas power plant to convert the produced methane to electricity.

* * * * *